Nov. 28, 1933.  E. LINDGREN  1,936,680
INTERMITTENT FILM ADVANCING MECHANISM
Filed May 19, 1931  4 Sheets-Sheet 1
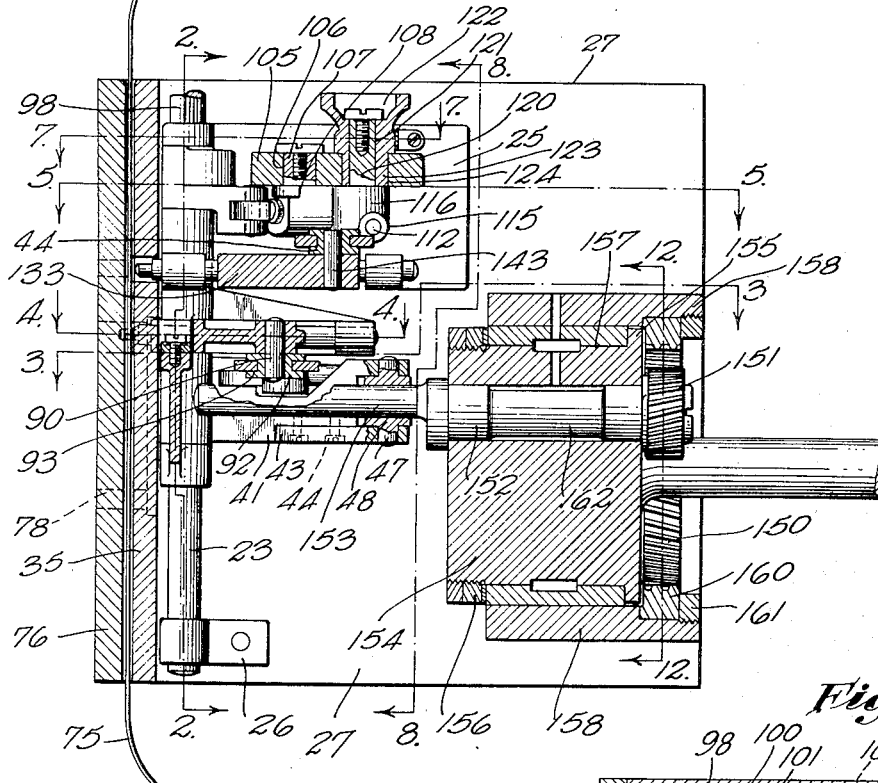
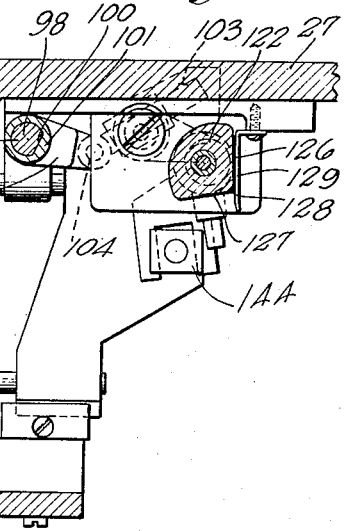
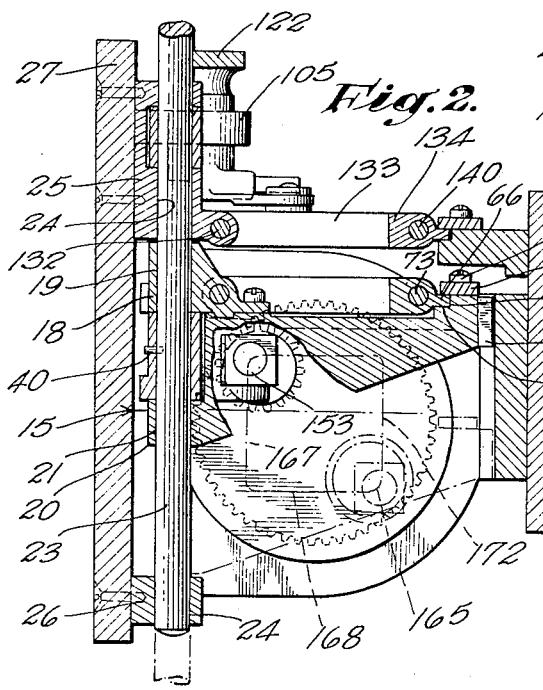
INVENTOR:
EDMUND LINDGREN,
BY
ATTORNEY.

Nov. 28, 1933.  E. LINDGREN  1,936,680
INTERMITTENT FILM ADVANCING MECHANISM
Filed May 19, 1931   4 Sheets-Sheet 2

INVENTOR:
EDMUND LINGREN,
BY

ATTORNEY.

Nov. 28, 1933.    E. LINDGREN    1,936,680
INTERMITTENT FILM ADVANCING MECHANISM
Filed May 19, 1931    4 Sheets-Sheet 3
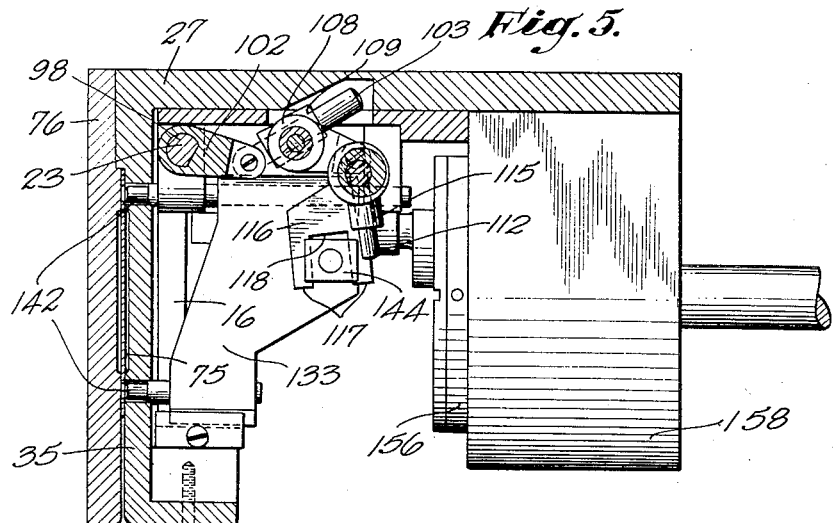
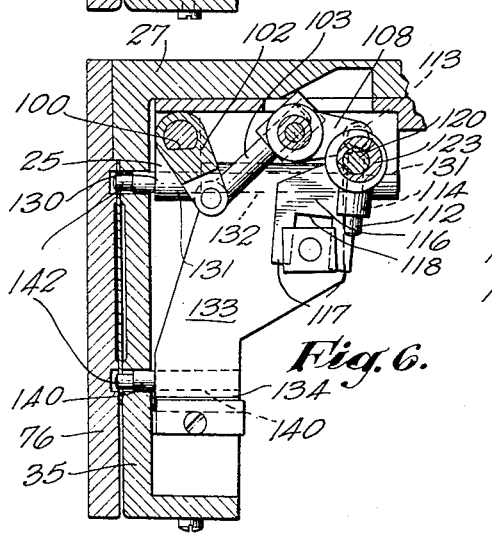
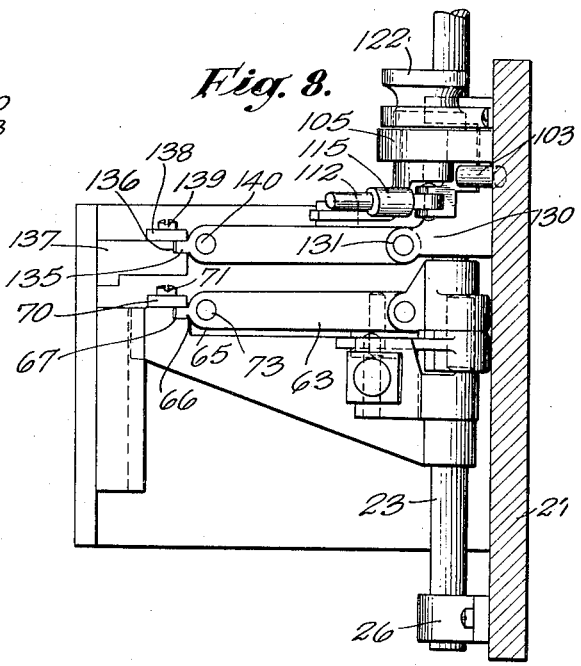
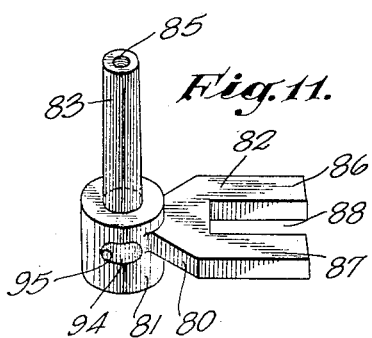
INVENTOR:
EDMUND LINGREN,
BY
ATTORNEY.

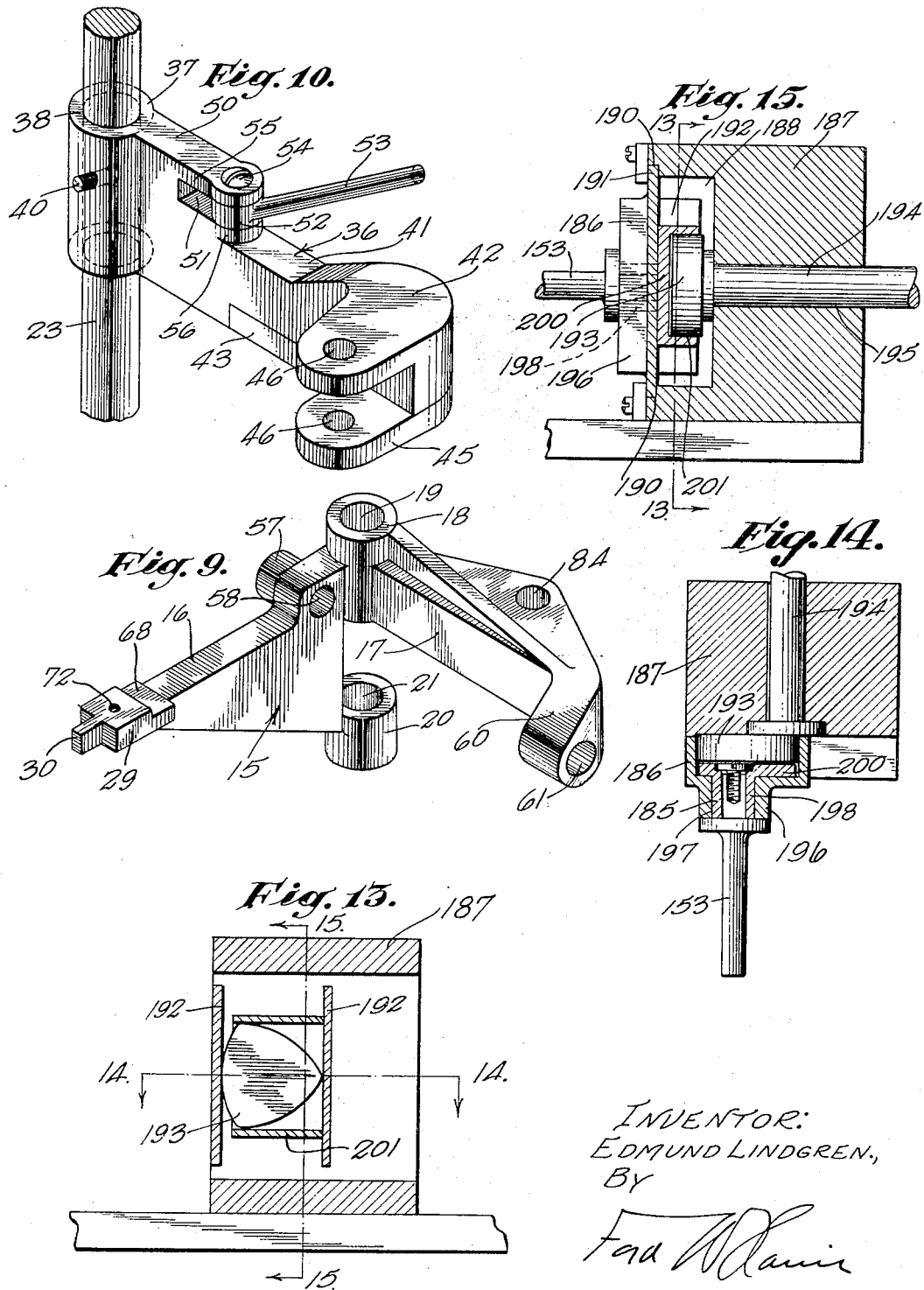

Patented Nov. 28, 1933

1,936,680

UNITED STATES PATENT OFFICE 1,936,680

INTERMITTENT FILM ADVANCING MECHANISM

Edmund Lindgren, Los Angeles, Calif.

Application May 19, 1931. Serial No. 538,488

20 Claims. (Cl. 88—18.4)

My invention relates to intermittent film advancing mechanism of the character employed in cameras, projectors, and printers, and has for its principal object to provide intermittent film advancing mechanism which will permit a relatively large shutter opening and will at the same time be relatively quiet and smooth in its operation.

It is an object of the invention to entirely avoid the use of cams so as to produce a substantially noiseless and smooth operation without sacrifice of other desirable qualities.

It is a further object of the invention to provide a device of the above character including a simple prime mover element for operating a film mover and registering device, this prime mover being rotary in its action yet having a reciprocating part adapted to move continuously through a prescribed orbit. In the preferred embodiment of the invention this prime mover comprises a rolling member adapted to roll in a circular path, and an eccentric or crank member secured to the rolling member in such a manner that the eccentric member will describe a substantially square orbit.

It is a further object of the invention to provide a simple form of actuating means for the pins which engage the film, the characteristic feature of this actuating means being that the pins have substantially no movement after they have entered perforations in the films to full extent. This simple actuating means when used in conjunction with pull-down pins produces a substantially complete penetration of the pull-down pins into the sprocket holes of the film before the movement of the film starts and maintains the pins in complete engagement with the sprocket holes throughout the downward movement of the film, thereby avoiding the sawing action on the film sprocket holes which is produced in intermittent mechanism having pull-down pins which move in and out of the sprocket holes during the time the film is being advanced from one position to another.

Further objects and advantages of the invention will be made evident throughout the following part of the specification.

Referring to the drawings, which are for illustrative purposes only,

Fig. 1 is a partly sectioned elevation of a preferred embodiment of my invention.

Fig. 2 is a vertical section taken substantially as indicated by the line 2—2 of Fig. 1.

Fig. 5 is a cross section on a plane represented by the line 5—5 of Fig. 1.

Fig. 6 is a sectional view similar to Fig. 5 but showing the registering pins held in engagement with the film by the registering pin actuating means.

Fig. 7 is a section on a plane represented by the line 7—7 of Fig. 1.

Fig. 8 is a section on a plane represented by the line 8—8 of Fig. 1.

Fig. 9 is a perspective view of the main or supporting body of the film mover of my invention.

Fig. 10 is a perspective view of the crank member adapted to be mounted on the body shown in Fig. 9.

Fig. 11 is a perspective view of a lever employed in the invention.

Fig. 13 is a section through the front portion of an alternative prime mover which may be employed in the practice of my invention, this section being taken on a plane represented by the line 13—13 of Fig. 15.

Fig. 14 is a cross section on a plane represented by the line 14—14 of Fig. 13.

Fig. 15 is a section taken on the line 15—15 of Fig. 13.

Figure 3:
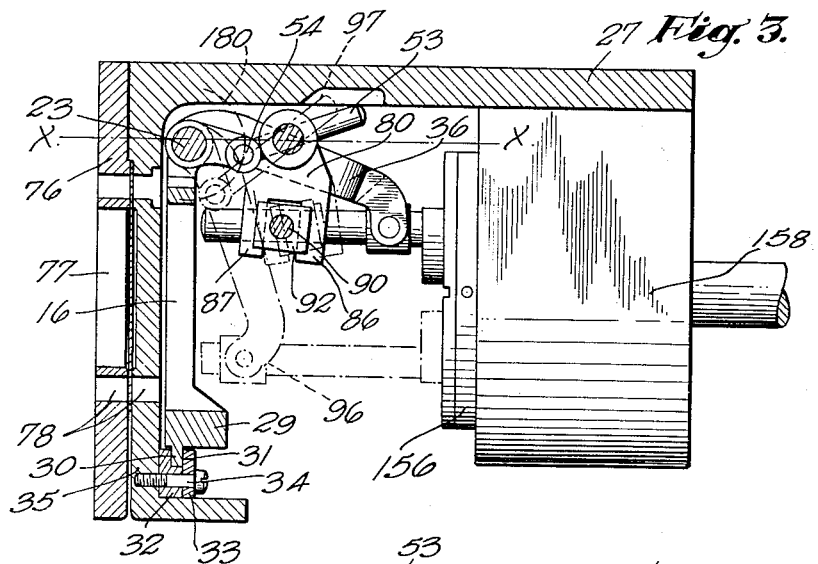
Fig. 3 is a cross section taken substantially as indicated by the line 3—3 of Fig. 1.
Figure 4:
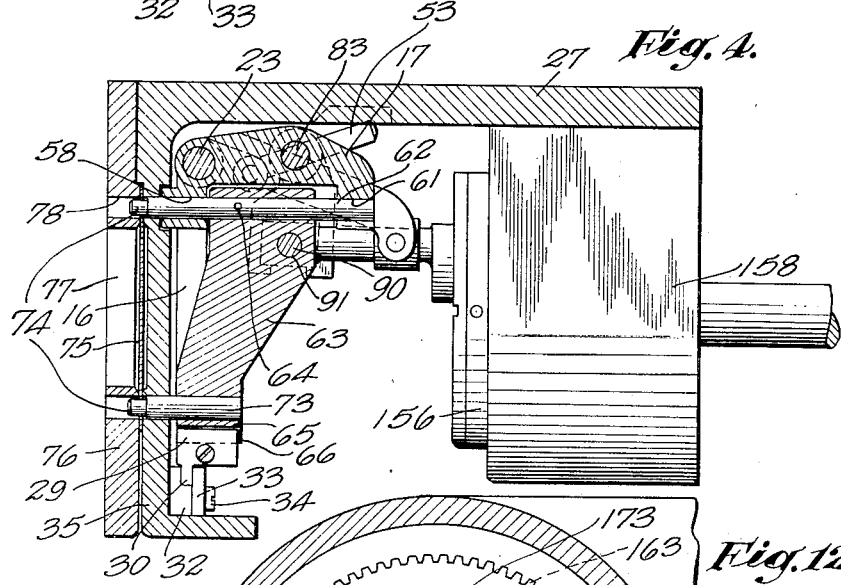
Fig. 4 is a cross section taken substantially as indicated by the line 4—4 of Fig. 1.

Referring particularly to Figs. 1 to 4 and 9, I employ a body 15 consisting of a triangular front wall 16 and a perpendicularly extending leg 17, which joins the front wall through a cylindrical hub 18 having a vertical opening 19 therein. Formed at the lower corner of the wall 16 is a hub or body 20 having a vertical opening 21 therein axially aligned with the opening 19. A vertical bar 23 extends through the openings 19 and 21 and also through openings 24 in upper and lower brackets 25 and 26 which are secured to a vertical wall 27. On the wall 16 at the side opposite the hubs 18 and 20, a block 29 is formed having a vertical blade or web 30 which, as shown in Figs. 3 and 4, projects into a vertical groove 31 formed between vertical plates 32 and 33 which are secured by screws 34 to a front wall 35 which extends perpendicular to the wall 27. Cooperating with the body 15 in the formation of the film mover of my invention is a crank member 36 having a vertical hub 37, as best shown in Fig. 10, which hub 37 provides a cylindrical wall 38 which fits between the hubs 18 and 20 of the body 15 and surrounds the part of the bar 23 which extends between the hubs 18 and 20. The crank 36 is pinned to the bar 23 by means of a pin 40, thus holding the bar 23 in a definite relationship to the body 15 and also causing the bar to partly rotate in accordance with the swinging motion of the crank during the operation of the intermittent mechanism. The crank includes an arm 41 having the outer end thereof provided with a forwardly bent lug 42, and to the lower face of the arm 41 a plate 43 is secured by screws 44, as shown in Fig. 1, this plate 43 having a forwardly extending lug 45 spaced below the lug 42. The lugs 42 and 45 are provided with aligned openings 46 adapted to receive vertically extending trunnions 47 which project from a slide member 48 consisting essentially of a cubic body received between the lugs 42 and 45, also as shown best in Fig. 1. Extending from the hub 37 above the inner portion of the arm 41 is a wall 50 having a longitudinal notch or slot 51 therein in which the head 52 of a swingable slide part 53 is received, this slide part being rotatably secured to the crank 36 by means of a vertical screw 54 which extends through the walls 55 and 56 of the slot 51 and through an opening in the head 52 of the swingable slide part 53. In the simple form of my invention the slide part 53 is in the form of a cylindrical bar, as shown.

As shown in Fig. 9, the upper part of the wall 16, adjacent the hub 18, has an outwardly extending boss 57 through which a horizontal opening 58 extends. At the outer end of the leg 17 a lug or boss 60 projects forwardly, and through this boss is an opening 61 axially aligned with the opening 58. As best shown in Fig. 4, a pin 62 is slidably mounted in the openings 58 and 61, and between the wall 16 and the lug 60 a body 63 is secured to the pin 62 by means of a cotter pin 64. The outer end 65 of the body 63 has a horizontal blade or web 66 which is slidably received, as shown in Figs. 2, 4, and 8, in a horizontal slide groove 67 formed between a horizontal wall 68 provided by the block 29 of the body 15 and a plate 70 which is secured on the upper face of the body 29 by means of a screw 71 which extends into a threaded opening 72 in the body 29. A pin 73 is secured in the end 65 of the body 63 in a position parallel to the pin or bar 62. The forward ends of the pins 62 and 73 are formed so as to provide pull-down pins 74 of a size to fit the sprocket holes of a motion picture film 75 which moves in the space provided therefor between the front wall 35 and an apertured wall 76 having an aperture 77 through which photographic images are transmitted to the film 75. The pull-down pins 74 formed at the forward ends of the pins 62 and 73 project into vertical slots 78 in the walls 35 and 76. The film engaging means, consisting of the pins 62 and 73, having pull-down pins 74 at their forward ends, and the body 63, is slidably supported on the vertically movable body 15. The pin 62 slides in the openings 58 and 61, and the projecting web 56 slides in the groove 67.

As a means for moving the film engagement means in and out of engagement with the film 75, my invention provides a lever member 80 of the form shown in Fig. 11, this lever member comprising a hub 81 having an arm 82 projecting radially therefrom, and an axially projecting pin 83 adapted to extend upwardly into a vertical opening 84 in the leg 17 of the body 15, the pin 83 having a threaded opening 85 in its upper end adapted to receive a screw. The arm 82 is of flat form and has two parallel legs 86 and 87 forming a radial slot 88. A pin 90 is pressed into an opening 91 in the body 63 and projects downwardly from the body 63 as shown in Fig. 1. On the downwardly projecting portion of the pin 90 a block 92 is turnably mounted, and this block is provided with grooves 93 on opposite sides thereof which receive the legs 86 and 87 of the lever 80, the body of the block 92 being slidable in the slot 88. The hub 81 of the lever 80 has a bore 94 into which the bar or swingable slide part 53 extends, as shown in Figs. 3 and 4. The cylindrical wall 95 of the opening 94 in the hub 81 constitutes a slide part having a fixed relationship to the lever 80; in other words, this fixed slide part of the lever 80 cannot move relative to the lever 80 but causes the lever 80 to swing or move with it. The swingable slide part 53 is pivotally secured to the crank 36 and therefore can swing relative to the crank as the movement of the crank causes it to slide relative to the opening 94 of the lever 80. When the crank 36 is swung outwardly, as shown in full lines in Fig. 3, the lever 80 is in the position in which it is shown in full lines in Fig. 3 and in dotted lines in Fig. 4, holding the block 63 forwardly, or leftwardly, so that the pull-down pins 74 engage the film 75. As the crank 36 swings from the position in which it is shown in full lines in Fig. 3 to the dotted line position 96, the pin 53 slides leftwardly through the opening 94 and swings toward and into the dotted line position 97 at an angle to the position in which it is shown in full lines, thereby causing the lever 80 to swing in anti-clockwise direction and thereby move the block 63 rightwardly so as to withdraw the pull-down pins 74 from engagement with the sprocket holes of the film 75.

The upper portion 98 of the bar 23 which extends through the upper bracket 25 is flattened, as shown best at 100 in Fig. 7. This portion of the bar 23 extends through the hub 101 of a short crank 102 which has a swingable slide part or pin 103 hinged thereto by means of a pin 104. As shown in Figs. 1, 2, 7, and 8, the bracket 25 includes a horizontally projecting wall 105 having an opening 106 which receives an upwardly extending pin 107 of an intermediate crank member 108 having an opening 109, as shown in Figs. 5 and 6, which receives the swingable slide part 103. The crank 108 has a swingable slide pin or part 112 pivoted thereto by means of a pin or screw 113, and this slide part 112 engages an opening 114 which extends through a horizontal cylinder 115 formed on a lever 116 having outwardly projecting arms 117 which lie on opposite sides of a slot 118. As best shown in Fig. 1, the lever 116 has an upwardly projecting pin 120 which extends through an opening 121 in a releasing knob 122 which has an eccentric wall 123 projecting downwardly into an opening 124 in the wall 105 of the bracket 25. As shown in Fig. 7, the lower portion of the knob 122 is provided with lateral faces 126 and 127 which meet at a corner 128. A spring member 129 is adapted to rest against either the face 126 or the face 127 to hold the knob in a desired position of rotation. The bracket 25 has leftwardly projecting arms 130 which are bored to provide aligned holes 131 for slidably receiving a pin or bar 132 which is secured in a block 133. This block 133 is of a form similar to the block 63, and at the end 134 thereof has a horizontally extending blade or web 135 adapted to be slidably received in a horizontal groove 136 formed by a block 137 and a gib or plate 138 which is secured in place by a screw 139. In a position above the pin 73, a pin 140 is secured in the end 134 of the body 133. The leftward ends of the pins 132 and 140 are cut down to provide registering projections or pins 142 which will move in and out of engagement with perforations of the film 75 in accordance with the movement of the body 133. As shown in Fig. 1, a pin 143 projects vertically upwardly from the body 133, and on the upper portion of the pin 143 a slide block 144 is secured, this slide block being similar in form to the block 92 and resting in the slot 118 of the lever 116.

When the crank 36 moves from its full line position of Fig. 3 to the dotted line position 96, the shaft 23 is thereby rotated, causing the crank 102 to swing from its position of Fig. 5 to the position in which it is shown in Fig. 6. This movement of the crank 102 swings the slide part 103 and causes the intermediate crank 108 to be rotated in anti-clockwise direction. The slide part or pin 112 of the crank 108 then produces a clockwise rotation of the lever 116 in response to the change in angular position of the slide pin 112 in consequence of the swinging movement of the crank 108. Therefore, as the crank 102 is swinging from its position of Fig. 5 to its position of Fig. 6, the registering pins 142 move from disengaged position, as shown in Fig. 5, into engagement with the film 75, as shown in Fig. 6, while the pull-down pins 74 are moving out of engagement with the film 75. The eccentric 123 associated with the knob 122 permits movement of the body 133 so as to remove the registering pins 142 from a position of engagement with the film 75 when it is desired to place a film in the advancing mechanism or to adjust or remove a film which has been previously placed therein. By rotating the knob 122 so as to bring the face 127 thereof against the spring 129, a partial rotation of the eccentric 123 is produced, which results in moving the pin 120 rightwardly and causing the lever 116 to swing rightwardly a sufficient distance to remove the registering pins 142 from engagement with the film 75 should the pins be in engagement with the film.

Figure 12:
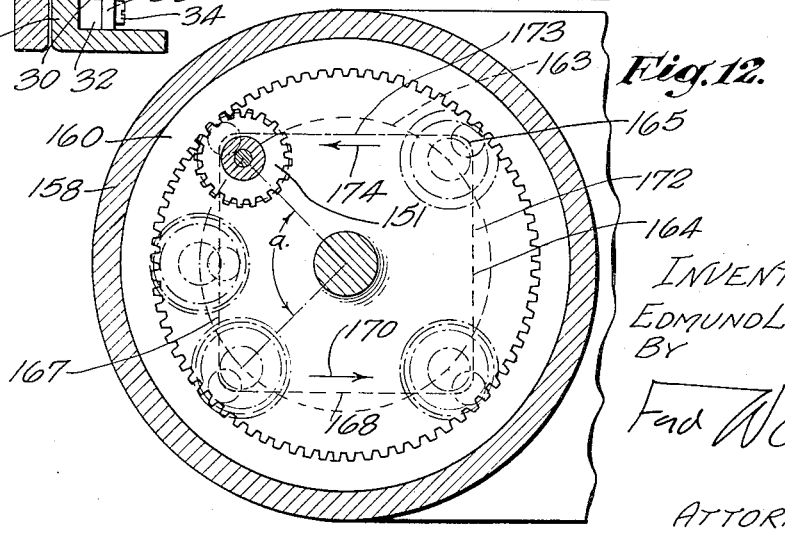
Fig. 12 is an enlarged section on a plane represented by the line 12—12 of Fig. 1.

In Figs. 1, 2, and 12, I show my improved prime mover or motivating means of the film advancing mechanism. This prime mover includes a rolling part 150 including a gear 151 mounted on a shaft 152, and an eccentric part or pin 153 which projects through the vertically rotatable block 48 mounted in the swinging end of the crank 36. The shaft 152 is mounted in a cylindrical block 154 having a flange 155 at its rightward end and ring nuts 156 at its leftward end for holding it in position in the bore 157 of a stationary body 158. In the rightward end of this stationary body 158 a ring gear 160 is secured in stationary relationship to the body 158 and is held in place by a threaded ring 161. A shaft 162 extends rightwardly from the body 154 and provides a means whereby the body may be continuously rotated so as to cause the rolling member 150 to roll in a circular path 163 and to rotate in a definitely timed relationship. The diameters of the gears 151 and 160 have a proportion or ratio of one to four, with the result that the eccentric pin 153 travels through a substantially square orbit 164, this orbit having slightly rounded corners 165. In Figs. 1, 2, 3, and 4, the eccentric is shown in full lines in what may be termed the initial position or position at the start of an advancing movement of the film 75. When the eccentric part 153 is in this initial or starting position, the pull-down pins 74 are in engagement with the film 75, and the registering pins 142 are disengaged from the film, as shown in Fig. 5. As the body 154 rotates through the angle $a$, Fig. 12, the eccentric part 153 moves down the side 167 of the substantially square orbit 164 and carries the crank member 36 vertically downwardly, and, owing to the fact that the crank member is mounted on the body 63, the entire film mover, together with the bar 23, is caused to move vertically downwardly through a forward movement. On reaching a position coincident with the bottom 168 of the orbit 164, the downward movement of the eccentric member 153 stops, and a movement of the eccentric part 153 across the bottom of the orbit in the direction of an arrow 170 in Fig. 12 is accomplished. In response to this movement of the eccentric part 153 across the bottom 168 of the orbit 164, the crank member 36 is swung from the position in which it is shown in full lines in Fig. 3 to its dotted line position 96, causing the eccentric movement of the swingable slide member 53 into the dotted line position 97, with the result of swinging the lever 80 so as to move the pull-down pins from engagement with the film, and at the same time the shaft 23 is swung through a partial rotation, which partial rotation is transmitted to the crank 102 and results in swinging the lever 116 from the position in which it is shown in Fig. 5 to the position in which it is shown in Fig. 6, with the result that as the pull-down pins 74 are drawn from engagement with the film 75, the registering pins 142 are moved into engagement with the film 75 to hold the film 75 stationary during the time the shutter associated with the aperture 77 is open, such shutter not being shown in the drawings for the reason that its use is common to film exposing devices. During the upward movement of the eccentric part 153 through the side 172 of the orbit 164, the crank member 36 is moved vertically upwardly in its inclined position shown in dotted lines 96 of Fig. 3, so that during the lifting of the body 15 and the film mover parts supported thereon, the pull-down pins 74 will remain in disengagement with the film 75, and the registering pins 142 will remain in engagement with the film 75. When the eccentric part 153 travels across the upper portion 173 of the orbit 164 in the direction indicated by an arrow 174 of Fig. 12, the body 15 remains substantially stationary, and a reverse swinging of the crank member 36 from its dotted line position 96 of Fig. 3 to its full line position is accomplished. As a result of this reverse movement of the crank member 36, the actuating mechanism associated with the pins 74 and 142 causes the pins 74 to move into engagement with the film 75, and the pins 142 to move from engagement with the film 75, preparatory to a consecutive forward movement of the film pull-down mechanism represented by the pins 74.

An especial feature of my invention is found in the mechanism for moving the pins 74 and 142 in and out of engagement with the film 75. As shown in Fig. 3, the pin or screw 54, by which the swingable slide part 53 is pivotally secured to the crank member 36, swings through an arc 180. When the screw 54 is in the position in which it is shown in full lines in Fig. 3, it is near a center line X—X which intersects the centers or axes of the vertical bar 23 and the vertical pin 83 of the lever 80; therefore, during the first part of the movement of the pin or screw 54 toward its dotted line position of Fig. 3, it moves in a direction nearly perpendicular to the center line X—X, and as the pin or screw 54 approaches its dotted line position, its direction of movement is nearly parallel to the center line X—X. Accordingly, the angular movement of the slide member 53 during the first part of the movement of the pin 54 toward its dotted line position of Fig. 3 is relatively rapid so that a greater portion of the movement of the lever 80 occurs during the time the pin 54 is near the center line X—X. This same condition applies to the crank 102 forming a part of the mechanism for moving the registering pins 142, and it further applies to the intermediate crank 108 and swingable slide part 112 pivoted thereto. During the time the parts 102, 103, 108, and 112 are in the positions in which they are shown in Fig. 6, a slight swinging movement of the crank member 36 produces substantially no inward or outward movement of the registering pins 142.

The above specified relationship between the cranks 102 and 108 produces a very rapid movement of the registering pins 142 into engagement with the sprocket holes of the film 75 as the eccentric part 153 starts across the bottom 163 of the orbit 164, and also compensates for any slight deflection of the eccentric member 153 from a true rectilinear movement as it passes upwardly through the side 172 of the orbit 164.

The eccentric part 153 preferably moves through a vertical plane parallel to the movement of the film 75, but in the practice of the invention the principal condition applying to the movement of the eccentric part 153 is that it shall move in a plane which is non-perpendicular to the line of movement of the film 75.

Although I have shown the movement of the eccentric part 153 produced by the rolling of a rolling part 150 through a circular path in order to avoid the use of cams, the movement of such part through a substantially square orbit may be accomplished by a cam mechanism such as shown in Figs. 13, 14, and 15, in which the eccentric part 153 projects from a vertically slidable member 185 which is held in a longitudinally slidable frame 186 slidably held in the front face of a body 187. As clearly shown in Fig. 15, the body 187 has a recess 188 in the front thereof and provides longitudinal ways or grooves 190 which receive flanges 191 formed on the upper and lower edges of the frame 186. Projecting inwardly from the frame 186 into the recess 188 are vertical side walls 192 which are spaced apart so as to project inwardly on opposite sides of a triangular cam 193 which is eccentrically mounted on the forward end of a shaft 194 extended through an opening or bearing 195 in the body 187 and adapted to be continuously rotated by a power means, not shown. The frame 186 has forwardly extending walls 196 which enclose the vertical slot in which a prismoidal portion 198 of the vertically slidable member 185 may reciprocate vertically. The prismoidal portion 198 extends outwardly from a vertical wall 200, and inwardly from the upper and lower edges of the wall 200 horizontal walls or flanges 201 project above and below the triangular cam member 193, as best shown in Fig. 15. It is characteristic of this mechanism that when the cam 193 is rotated through a circular path in response to rotation of the shaft 194, the member 185 and the part 153 projecting therefrom will move through a substantially square orbit, and the parts of this mechanism may be readily designed to produce a square orbit of movement for the part 153 having a height equal to one film frame. By placing this mechanism so that the part 153 will engage the block 48, actuation of the crank member 36 may be accomplished, and the movement and registration of a film, such as the film 75, may be thereby obtained.

Although I have herein shown and described my invention in simple and practical form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

I claim as my invention:

1. An intermittent mechanism of the character described, including: a film mover having engagement means adapted to engage the sprocket holes of a film to be moved; supporting means for movably supporting said film mover for movement in a path parallel to the direction of movement of said film; a prime mover for reciprocating said film mover, said prime mover comprising an internal gear, a spur gear of one-quarter the pitch diameter of said internal gear, means for rolling said spur gear in said internal gear, and an eccentric part connected to said spur gear and having operative connection with said film mover; and means associated with said engagement means and said prime mover and being actuated by said prime mover, for producing engagement of said engagement means with said film to be moved during forward movement of said film mover.

2. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a rolling member, means for causing said rolling member to roll on a circular path, having a diameter larger than said rolling member, and an eccentric part connected to said rolling member, said eccentric part operatively engaging said film mover; and means associated with said engagement means and said prime mover for producing engagement of said engagement means with said film to be moved during forward movement of said film mover.

3. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a rolling gear, a stationary gear of larger diameter than said rolling gear, means for causing said rolling gear to roll in engagement with said stationary gear, and an eccentric part connected to said rolling gear, said eccentric part engaging said film mover; and means associated with said engagement means and said prime mover for producing engagement of said engagement means with said film to be moved during forward movement of said film mover.

4. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a rolling gear, a ring gear, means for causing said rolling gear to roll within said ring gear, and an eccentric part connected to said rolling gear, said eccentric part engaging said film mover; and means associated with said engagement means and said prime mover for producing engagement of said engagement means with said film to be moved during forward movement of said film mover.

5. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a primary gear, a secondary gear having a diameter four times that of the primary gear, means for causing said primary gear to roll in engagement with said secondary gear, and an eccentric part connected to said primary gear, said eccentric part engaging said film mover; and means associated with said engagement means and said prime mover for producing engagement of said engagement means with said film to be moved during forward movement of said film mover.

6. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a rolling member, means for causing said rolling member to roll on a circular path having a diameter four times the diameter of said rolling member and an eccentric part connected to said rolling member, said eccentric part having its center situated between the center and the periphery of said rolling member and operatively engaging said film mover; and means associated with said engagement means and said prime mover for producing engagement of said engagement means with said film to be moved during forward movement of said film mover.

7. An intermittent mechanism of the character described, including: a film mover having engagement means adapted to engage a film to be moved; supporting means for movably supporting said film mover for movement in a path parallel to the direction of movement of said film; a prime mover for reciprocating said film mover, said prime mover comprising a rolling gear, a stationary gear having a diameter four times the diameter of said rolling gear, means for causing said rolling gear to roll in engagement with said stationary gear, and an eccentric part connected to said rolling gear, said eccentric part being eccentric relative to the axis of said rolling gear a radial dimension less than the radius of said rolling gear and engaging said film mover; and means associated with said engagement means and said prime mover for producing engagement of said engagement means with said film to be moved during forward movement of said film mover.

8. An intermittent mechanism of the character described, including: film mover guide means; a film mover adapted to be guided by said guide means, said film mover having engagement means adapted to engage a film; a prime mover having a part traveling continuously through a polygonal orbit in a plane parallel to said film at the zone of engagement of said film by said film mover; means for connecting said part to said film mover so as to cause said film mover to reciprocate in said guide means; and means for connecting said part to said engagement means for causing said engagement means to engage said film during the forward movement of said film mover.

9. An intermittent mechanism of the character described, including: film mover guide means; a film mover adapted to be guided by said guide means, said film mover having engagement means adapted to engage a film; a prime mover having a part traveling continuously through a substantially square orbit in a plane parallel to said film at the zone of engagement of said film by said film mover; means connecting said film mover to said part of said prime mover for causing said film mover to reciprocate in said guide means; and means for connecting said part to said engagement means for causing said engagement means to engage said film during the forward movement of said film mover.

10. An intermittent mechanism of the character described, including: film mover guide means; a film mover adapted to be guided by said guide means, said film mover having engagement means adapted to engage a film; a prime mover having a part traveling continuously through a substantially square orbit in a plane parallel to said film at the zone of engagement of said film by said film mover; a member mounted on said film mover so as to move transversely relative to the movement of said film mover, said member being connected to said part of said prime mover so as to be moved thereby; and means connecting said member to said engagement means so as to cause said engagement means to engage said film during the forward movement of said film mover.

11. An intermittent mechanism of the character described, including: film mover guide means; a film mover adapted to be guided by said guide means, said film mover having engagement means adapted to engage a film; a prime mover having a part traveling continuously through a substantially square orbit in a plane parallel to said film at the zone of engagement of said film by said film mover; a member hinged on said film mover on an axis longitudinal with respect to the direction of movement of said film mover, so as to move transversely relative to the movement of said film mover, said member being connected to said part of said prime mover so as to be moved thereby; and means connecting said member to said engagement means so as to cause said engagement means to engage said film during the forward movement of said film mover.

12. An intermittent mechanism of the character described, including: means forming a path of movement of a film; a body adapted to move along said path; means for moving said body; film engagement means mounted on said body so as to be inwardly and outwardly movable relative to said path; a crank pivoted on said body; means for swinging said crank; a lever pivoted on said body, there being a fixed slide part on said lever; a swingable slide part pivotally mounted on said crank and engaging said fixed slide part; and means connecting said lever to said film engagement means.

13. A device as defined in claim 12, in which said means for swinging said crank comprises a primary slide member swingably secured to said crank, a secondary slide member engaging said primary slide member, and means for moving said secondary slide member in a direction to produce a swinging movement of said crank.

14. An intermittent mechanism of the character described, including: means forming a path of movement of a film; a body adapted to move along said path; a crank pivoted on said body; film engagement means mounted on said body so as to be inwardly and outwardly movable relative to said path, said means comprising a primary slide member pivotally secured to said crank, a secondary slide member engaging said primary slide member, and means for moving said secondary slide member in a substantially square orbit in a plane non-perpendicular to the direction of movement of said body; a lever pivoted on said body, there being a fixed slide part on said lever; a swingable slide part pivotally mounted on said crank and engaging said fixed slide part; and means connecting said lever to said film engagement means.

15. An intermittent mechanism of the character described, including: means forming a path of movement of a film; a body adapted to move along said path; means for moving said body; film engagement means mounted on said body so as to be inwardly and outwardly movable relative to said path; a crank pivoted on said body; means for swinging said crank; a lever pivoted on said body, there being a fixed slide part on said lever; a swingable slide part pivotally mounted on said crank and engaging said fixed slide part; means connecting said lever to said film engagement means; a bar extending longitudinally with respect to the movement of said body and being connected to said crank so as to be partly rotated in accordance with the partial rotation of said crank; and film holding means having registering members actuated by said bar.

16. A pin actuating means for film handling mechanism, including: a support; a swingable crank; a pin movably carried by said support adapted to engage the film; a lever pivotally mounted on said support, said lever having a fixed slide part; swingable slide means pivoted on said crank and slidably engaging said fixed slide part; means connecting said pin to said lever; and means for swinging said crank.

17. A pin actuating means for film handling mechanism, including: a support; a swingable crank; a pin movably carried by said support adapted to engage the film; a lever having a fixed slide part; adjustable pivot means for supporting said lever; swingable slide means pivoted on said crank and slidably engaging said fixed slide part; means connecting said pin to said lever; and means for swinging said crank.

18. A pin actuating means for film handling mechanism, including: a support; a swingable crank; a pin movably carried by said support adapted to engage the film; a lever having a fixed slide part; adjustable pivot means for supporting said lever; swingable slide means pivoted on said crank and slidably engaging said fixed slide part; means connecting said pin to said lever; and means for swinging said crank comprising a fixed slide means on said crank and a swingable slide member slidably engaging said fixed slide means.

19. An intermittent mechanism of the character described, including: a film mover having engagement means adapted to engage a film to be moved; supporting means for movably supporting said film mover; and a prime mover for reciprocating said film mover, said prime mover comprising an internal gear, a spur gear of one-quarter the pitch diameter of said internal gear, means for rolling said spur gear in said internal gear, and an eccentric part connected to said spur gear and having operative connection with said film mover.

20. An intermittent mechanism of the character described, including: means forming a path of movement of a film; a body adapted to move along said path; means traveling continuously through a square orbit for motivating said body; film engagement means mounted on said body so as to be inwardly and outwardly movable relative to said path; a crank pivoted relative to said body; means actuated by said motivating means for swinging said crank; a lever pivoted relative to said body, there being a fixed slide part on said lever; a swingable slide part pivotally mounted on said crank and engaging said fixed slide part; and means connecting said lever to said film engagement means.

EDMUND LINDGREN.